(12) United States Patent
Jaradi et al.

(10) Patent No.: US 11,801,801 B1
(45) Date of Patent: Oct. 31, 2023

(54) DEPLOYABLE CARGO PANEL

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/749,313

(22) Filed: May 20, 2022

(51) Int. Cl.
*B60R 21/231* (2011.01)
*B60R 21/214* (2011.01)
*B60N 2/90* (2018.01)
*B60R 21/01* (2006.01)
*B60R 21/02* (2006.01)
*B60R 21/217* (2011.01)

(52) U.S. Cl.
CPC ........... *B60R 21/214* (2013.01); *B60N 2/919* (2018.02); *B60R 21/01* (2013.01); *B60R 21/026* (2013.01); *B60R 21/231* (2013.01); *B60R 2021/01211* (2013.01); *B60R 2021/01286* (2013.01); *B60R 2021/0253* (2013.01); *B60R 2021/0266* (2013.01); *B60R 2021/0273* (2013.01); *B60R 2021/2173* (2013.01); *B60R 2021/23153* (2013.01); *B60R 2021/23161* (2013.01)

(58) Field of Classification Search
CPC ..... B60R 21/214; B60R 21/01; B60R 21/231; B60R 21/2338; B60R 21/026; B60R 21/02; B60R 21/0136; B60R 21/20; B60R 21/213; B60R 21/06; B60R 21/08; B60R 2021/01211; B60R 2021/01252; B60R 2021/01286; B60R 2021/23153; B60R 2021/23386; B60R 2021/0266; B60R 2021/23161; B60R 2021/0273; B60R 2021/168; B60R 2021/0253; B60R 2021/2173; B60R 2021/0293; B60R 2021/0407; B60R 5/04; B60N 2/90; B60N 2/919
USPC ......... 280/730.1, 743.2, 728.1, 728.2, 743.1, 280/748, 749, 751, 753; 410/119; 180/271, 274; 296/24.43
See application file for complete search history.

(56) References Cited

U.S. PATENT DOCUMENTS 5,085,382 A * 2/1992 Finkenbeiner ........... B64D 9/00
188/371
6,004,084 A * 12/1999 Moker .................. B60R 21/207
410/117
9,296,351 B1 3/2016 Madrigal Medina et al.
(Continued)

FOREIGN PATENT DOCUMENTS

CN 204623328 U 9/2015
DE 4322936 A1 * 1/1995 ........... B60R 21/026
(Continued)

*Primary Examiner* — Keith J Frisby
(74) *Attorney, Agent, or Firm* — Frank A. MacKenzie; Bejin Bieneman PLC (57) ABSTRACT

An assembly for a vehicle includes a vehicle roof and a panel rotatably connected to the vehicle roof. The panel is rotatable away from the vehicle roof from a stowed position to a deployed position. The assembly includes an airbag supported on the panel. The airbag is inflatable from the panel in a vehicle-forward direction when the panel is in the deployed position.

17 Claims, 7 Drawing Sheets

(56) References Cited

U.S. PATENT DOCUMENTS

| | | | |
|---|---|---|---|
| 2019/0315304 A1* | 10/2019 | Chen | B60R 21/2338 |
| 2019/0381968 A1 | 12/2019 | Kwon | |
| 2022/0097640 A1* | 3/2022 | Yetukuri | B60R 21/02 |
| 2022/0203923 A1* | 6/2022 | Jaradi | B60R 21/264 |

FOREIGN PATENT DOCUMENTS

| | | | | |
|---|---|---|---|---|
| DE | 10223684 B4 | | 12/2005 | |
| DE | 102007017998 A1 | * | 10/2008 | B60R 21/207 |
| DE | 102007023754 A1 | | 11/2008 | |
| DE | 102007026366 A1 | * | 12/2008 | B60R 21/08 |
| DE | 202009015507 U1 | * | 7/2010 | A01K 1/0272 |
| DE | 102012010501 A1 | | 11/2013 | |
| DE | 102018207567 A1 | | 11/2019 | |
| EP | 1110808 A1 | * | 6/2001 | B60N 2/4221 |
| JP | H11198699 A | * | 7/1999 | |
| JP | 2006224807 A | * | 8/2006 | |
| JP | 2006273151 A | * | 10/2006 | |
| JP | 2018058431 A | | 4/2018 | |
| JP | 2020044927 A | * | 3/2020 | |
| KR | 0171344 B1 | * | 2/1999 | |

* cited by examiner

DEPLOYABLE CARGO PANEL

BACKGROUND

A vehicle may include space to stow cargo during operation. The vehicle may include a designated space to stow cargo, for example, a cargo compartment. As one example, a vehicle's cargo compartment may be separate from a passenger compartment. As another example, the cargo compartment may be open to the passenger compartment. Additionally, the vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly for a vehicle includes a vehicle roof and a panel rotatably connected to the vehicle roof. The panel is rotatable away from the vehicle roof from a stowed position to a deployed position. The assembly includes an airbag supported on the panel. The airbag is inflatable from the panel in a vehicle-forward direction when the panel is in the deployed position.

The assembly may include a seat having a seatback, the panel being adjacent the seatback in the deployed position.

The panel may abut the seatback in the deployed position.

The panel may be rigid relative to the airbag.

The assembly may include a seat having a seatback, the airbag being inflatable above the seatback when the panel is in the deployed position.

The seat may include a head restraint, the airbag being inflatable around the head restraint.

The assembly may include a first seat and a second seat, the panel being adjacent the first seat and the second seat in the deployed position.

The assembly may include a first seat and a second seat each having a seatback, the airbag being inflatable to an inflated position above the seatbacks of the first seat and the second seat.

The assembly may include a motor between the vehicle roof and the panel, the motor being actuatable to rotate the panel relative to the vehicle roof between the stowed position and the deployed position.

The motor may include a pressure sensor, the rotation of the panel being stopped in response to an obstacle detected by the pressure sensor.

The assembly may include a seat having a seatback, a locking device supported on the seatback, the panel being engaged with the locking device in the deployed position.

The airbag may be elongated cross-vehicle when the panel is in the deployed position.

The airbag may be spaced from the vehicle roof when the panel is in the deployed position.

The panel may include at least one opening extending through the panel from the vehicle-passenger compartment to the vehicle-cargo compartment.

The assembly may include a controller programmed to rotate the panel from the stowed position to the deployed position in response to the vehicle initialization.

The controller may be programmed to rotate the panel between the deployed position and the stowed position in response to a user selection.

The controller may be programmed to stop rotation of the panel in response to a detected object.

With reference to the Figures wherein like numerals indicate like views, an assembly 10 for a vehicle 12 includes a vehicle roof 14 and a panel 16 rotatably connected to the vehicle roof 14. The panel 16 is rotatable away from the vehicle roof 14 from a stowed position to a deployed position. The assembly 10 includes an airbag 18 supported on the panel 16. The airbag 18 is inflatable from the panel 16 in a vehicle-forward direction when the panel 16 is in the deployed position.

Occupants 28 of the vehicle 12 may use the vehicle 12 to store cargo during use of the vehicle 12. The occupants 28 may place the cargo vehicle-rearward of the occupants 28, i.e., behind the occupants 28. During sudden deceleration, e.g., sudden stops, vehicle collisions, etc., cargo may be urged vehicle-forward and toward the occupants 28. When the panel 16 is in the deployed position, the panel 16 retains the cargo. In other words, during sudden deceleration where the cargo is urged vehicle-forward toward the occupants 28, the vehicle-forward movement of the cargo is impeded by the panel 16. Because the panel 16 is rotatable between the stowed position and the deployed position, the occupant 28 can stow the panel 16 when the occupant 28 desires, e.g., when there is no cargo in the vehicle 12.

The assembly 10 also includes the airbag 18. When the panel 16 is in the deployed position, the airbag 18 is inflatable vehicle-forward to control the kinematics of the occupant 28. Thus, during a vehicle collision, the airbag 18 is inflated vehicle-forward to control the kinematics of the occupant(s) 28, if any, of the vehicle 12.

The vehicle 12 may be any type of passenger or commercial automobile such as a car, a truck, a sport utility vehicle, a crossover, a van, a minivan, a taxi, a bus, etc. The vehicle 12, for example, may be operated by a driver and/or may be an autonomous vehicle in which the vehicle 12 is autonomously operated such that the vehicle 12 may be driven without constant attention from a driver, i.e., the vehicle 12 may be self-driving without human input.

The vehicle 12 includes a vehicle body 20. The vehicle body 20 may be of any suitable architecture such as unibody construction, body-on-frame construction, etc. The frame and the vehicle body 20 may be of any suitable material, for example, steel, aluminum, and/or fiber-reinforced plastic, etc.

The vehicle body 20 defines a vehicle interior 22. The vehicle interior 22 extends across the vehicle 12, i.e., from one side of the vehicle 12 to the other side of the vehicle 12.

The vehicle interior 22 includes a front end 22a and a rear end 22b with the front end 22a being in front of the rear end 22b during forward movement of the vehicle 12. The vehicle interior 22 includes a passenger compartment 24 and a cargo compartment 26. As shown in the Figures, the passenger compartment 24 is at the front end 22a of the vehicle interior 22 and the cargo compartment 26 is at the rear end 22b of the vehicle interior 22.

The passenger compartment 24 houses occupants 28, if any, of the vehicle 12. The passenger compartment 24 may extend across the vehicle 12, i.e., from one side to the other side of the vehicle 12. The passenger compartment 24 may include a front end 24a and a rear end 24b. The passenger compartment 24 may include an instrument panel and vehicle controls at the front end 24a of the passenger compartment 24.

The cargo compartment 26 is designed to stow cargo, if any, in the vehicle 12. The cargo compartment 26 may extend across the vehicle 12, i.e., from one side to the other side of the vehicle 12. The cargo compartment 26 may include a front end 26a and a rear end 26b. As an example, shown in the Figures, the vehicle 12 may include a liftgate at the rear end 26b of the cargo compartment 26.

The passenger compartment 24 and the cargo compartment 26 are adjacent each other. As shown in the Figures, the rear end 24b of the passenger compartment 24 is adjacent the front end 26a of the cargo compartment 26. The passenger compartment 24 and the cargo compartment 26 may be adjustable relative to each other. In other words, the vehicle interior 22 may be configurable to adjust the size of the passenger compartment 24 and the cargo compartment 26, relative to each other. As described further below, the vehicle 12 includes seats 30. As an example, the vehicle 12 may have a third row of seats 30. The third row of seats 30 may be adjustable, e.g., foldable, such that the third row of seats 30 has an upright position and a stowed position. In the upright position, an occupant 28 can occupy the seat 30. In the folded position, a back of a seatback 36 defines a lower boundary of the vehicle interior 22. When the third row of seats 30 is in the upright position, the portion of the vehicle interior 22 with the third row of seats 30 is the passenger compartment 24. When the third row of seats 30 is in the folded/stowed position, the same portion of the vehicle interior 22 is the cargo compartment 26.

The vehicle body 20 includes a floor 32 and the roof 14. The roof 14 may define the upper boundary of the vehicle body 20 and may extend from the front end 22a of the vehicle interior 22 to the rear end 22b of the vehicle interior 22. As shown in the Figures, the vehicle-passenger compartment 24 and the vehicle-cargo compartment 26 are below the vehicle roof 14. The floor 32 is below the roof 14. The floor 32 may define the lower boundary of the vehicle body 20 and may extend from the front end 22a of the vehicle interior 22 to the rear end 22b of the vehicle interior 22.

The roof 14 may include roof rails, one or more roof bows, and a roof panel. The roof rails may be elongated in the vehicle fore-and-aft direction. The roof 14 may include two roof rails with one roof rail at one side of the roof and the other roof rail at the other side of the roof. The roof bow may be elongated in the cross-vehicle direction from one roof rail to another roof rail.

The roof panel is disposed above the roof rails and the roof bows and is supported by the roof rails and/or the roof bows. The roof panel has a class-A surface, a finished surface exposed to view by a customer and free of unaesthetic blemishes and defects. Specifically, the class-A surface faces outwardly to the exterior of the vehicle 12. The roof rails, the roof bows, and/or the roof panel may be metal (e.g., aluminum, steel, etc.), composite material, e.g., fiber reinforced thermoplastic, sheet molding compound (SMC), etc., or any suitable material.

The vehicle 12 may include a headliner. The headliner may be supported by the vehicle body 20. Specifically, the headliner may be supported by the roof 14, e.g., the roof rails and/or the roof bows. The headliner is above the vehicle interior 22 and below the roof 14, i.e., the headliner is between the vehicle interior 22 and the roof 14. The headliner and the roof 14 (e.g., the roof rails, roof bows, and/or roof panel) may define a cavity to house the panel 16 in the stowed position, as described further below. The headliner may define the upper boundary of the vehicle interior 22. The headliner includes a class-A surface facing the vehicle interior 22, i.e., a surface specifically manufactured to have a high quality, finished, aesthetic appearance free of blemishes. The headliner may be one of, or any combination of, e.g., plastic, foam, upholstery, etc.

The vehicle 12 includes at least one door 34a, 34b openable relative to the vehicle body 20 for occupants 28 to enter and exit the passenger compartment 24. In the example shown in the Figures, the vehicle 12 includes a front door 34a and a rear door 34b. In such an example, the front door 34a provides access to the front end 24a of the passenger compartment 24 and the rear door 34b provides access to the rear end 24b of the passenger compartment 24.

The vehicle body 20 may include pillars. The pillars may extend from the roof 14 to the floor 32. Specifically, the vehicle body 20 may include pillars on both sides of the vehicle 12. In the example shown in the Figures, each side of the vehicle 12 includes an A-pillar, B-pillar, and C-pillar. The A-pillars may extend between the windshield and the front doors 34a. In other words, the A-pillars may be disposed at the front end 22a of the vehicle interior 22. The B-pillars may extend between the front door 34a and the rear door 34b, i.e., between adjacent doors. The vehicle 12 may include additional pillars, e.g., D-pillars.

The vehicle 12 includes one or more seats 30 in the passenger compartment 24. The seats 30 may be arranged in any suitable arrangement. In the examples shown in the Figures, one or more of the seats 30 may be at the front end 24a of the passenger compartment 24, i.e., a front seat, and one or more of the seats 30 may be at the rear end 24b of the passenger compartment 24, i.e., a rear seat. As shown in the Figures, the rear seats 30 may be a second row of seats 30. As another example, the rear seats 30 may be in a third row of seats 30. As shown in the Figures, the rear seat 30 may extend across the passenger compartment 24, e.g., from one side to the other side of the vehicle 12. The rear seats 30 may be any suitable type, e.g., bench seats, bucket seats, etc. As shown in the Figures, the rear seat 30 is a bench seat.

The seat 30 may include the seatback 36 and a seat bottom 38. The seatback 36 may be supported by the seat bottom 38 and may be stationary or movable relative to the seat bottom 38. The seatback 36 and the seat bottom 38 may be adjustable in multiple degrees of freedom. Specifically, the seatback 36 and the seat bottom 38 may themselves be adjustable. In other words, adjustable components within the seatback 36 and the seat bottom 38 may be adjustable relative to each other.

As described above, in the upright position, the seat 30 may be occupied by an occupant 28. In the examples shown in the Figures, the rear seats 30 are in the upright position.

The seat 30 may have multiple stowed positions. As one example, the seat 30 may be a bucket seat. In such an example, in the stowed position the seatback 36 is generally parallel to the seat bottom 38. In other words, the seatback 36 rotates downwardly toward the seat bottom 38. As another example, the seat 30 may be a bench seat. In such an example, in the stowed position the seatback 36 is aligned with the floor 32 of the vehicle interior 22, e.g., a box in the cargo compartment 26 may sit generally flat on the seatback 36 and the floor 32. In other words, the seatback 36 is generally continuous with the floor 32 of the cargo compartment 26 in the stowed position. As yet another example, the seat 30 may be removable, i.e., removable from the vehicle 12. In such an example, in the stowed position the seat 30 is not in the vehicle 12.

The seat 30 includes an inboard side 30b and an outboard side 30a spaced from each other in the cross-seat direction, e.g., in a cross-vehicle direction when the seat 30 is forward facing. The seatback 36 includes a front 36a extending from the inboard side 30b to the outboard side 30a and a rear 36b extending from the inboard side 30b to the outboard side 30a. As shown in the Figures, when the seatback 36 is forward-facing in the upright position, the front 36a of the seatback 36 faces vehicle-forward and the rear 36b of the seatback 36 faces vehicle rearward. When the seatback 36 is in the stowed position, the front 36a of the seatback 36 faces the floor 32, i.e., abuts the seat bottom 38, and the rear 36b of the seatback 36 faces the roof 14.

The seat 30 includes an occupant seating area 40. The seatback 36 and the seat bottom 38 define the occupant seating area 40. The occupant seating area 40 is in a seat-forward direction of the seatback 36 and above the seat bottom 38. Specifically, the seatback 36 defines the occupant seating area 40 between the inboard side 30b and the outboard side 30a. The front 36a of the seatback 36 between the inboard side 30b and the outboard side 30a defines the occupant seating area 40. The occupant seating area 40 is the area occupied by an occupant 28 when properly seated on the seat 30.

The seatback 36 includes a top 36c between the inboard side 30b and the outboard side 30a. Specifically, the top 36c extends from the inboard side 30b to the outboard side 30a. The seatback 36 is elongated from the seat bottom 38 to the top 36c of the seatback 36. In other words, as shown in the Figures, the top 36c may terminate at the inboard side 30b and the outboard side 30a.

The seat 30 may include a head restraint 42. In the example shown in the Figures, the head restraint 42 is supported on the seat 30. Specifically, the head restraint 42 is supported on the top 36c of the seatback 36.

The seatback 36 and the seat bottom 38 may each include a frame (not shown) and a covering (not shown) supported on the frame. The frame may be of any suitable plastic material, e.g., carbon fiber reinforced plastic (CFRP), glass fiber-reinforced semi-finished thermoplastic composite (organosheet), etc.; any suitable metal such as steel, aluminum, etc.; etc. The covering may include upholstery and padding. The upholstery may be cloth, leather, faux leather, or any other suitable material. The upholstery may be stitched in panel 16 around the frame. The padding may be between the covering and the frame and may be foam or any other suitable material. The covering on the rear 36b of the seatback 36 may be of a different material than the covering on the front 36a of the seatback 36. As an example, the covering on the rear 36b of the seatback 36 may be, e.g., carpet.

The seat 30 may include a locking device 44. As shown in the Figures, the locking device 44 is supported on the seatback 36. Specifically, the locking device 44 is supported on the rear 36b of the seatback 36. The locking device 44 may be anchored to, for example, the seatback 36 frame. The locking device 44 is positioned to receive the panel 16 when the panel 16 is in the deployed position, as described below. The locking device 44 is engaged with the panel 16 in the deployed position. The locking device 44, when engaged with the panel 16, is designed to prevent movement of the panel 16. Specifically, the locking device 44 engages the panel 16 to prevent rearward movement of the panel 16. In other words, the locking device 44 locks the panel 16 in the deployed position.

The locking device 44 may be triggered in any suitable manner As one example, the locking device 44 may engage the panel 16 automatically when the panel 16 is in the deployed position, i.e., when the panel 16 is rotated from the stowed position to the deployed position. As another example, the occupant 28 may manually engage the locking device 44, e.g., with a switch or toggle, etc. The locking device 44 may be any suitable conventional locking device 44 known in the art, e.g., a latch, etc. As described further below, in examples where the seat 30 includes the locking device 44, the panel 16 includes a mating locking component 46.

The vehicle 12 includes a panel assembly 48. The panel assembly 48 includes the panel 16, the airbag 18, and an inflator 50. The panel assembly 48 may include a motor 52 to move the panel 16, as described further below. In the example shown in the Figures, upon vehicle 12 initialization, the motor 52 moves the panel 16 downwardly away from the roof 14 to the deployed position. In the deployed position, the panel 16 is between the vehicle-passenger compartment 24 and the vehicle-cargo compartment 26. In other words, in the deployed position, the panel 16 separates the passenger compartment 24 and the cargo compartment 26. During a vehicle 12 collision, the airbag 18 is inflated above the top 36c of the seatback 36 toward the occupant seating area 40 to control the kinematics of the occupant 28. In other examples, the panel assembly 48 may be designed so that the panel 16 is moved manually by the occupant between the stowed position and the deployed position. In other words, the occupant may grasp the panel 16 by hand and move the panel 16 between the stowed position and the deployed position. In such examples, the panel assembly 48 may not include the motor 52 or may include the motor 52 and the panel 16 may be selectively disengaged from the motor 52 when moved by the occupant, e.g., with a clutch, release, etc.

As discussed above, the vehicle 12 includes the panel 16. The panel 16 may be planar. The panel 16 is rigid relative to the airbag 18. Specifically, the panel 16 acts as a reaction surface for the airbag 18 in the inflated position.

The panel 16 has a passenger side 16a and a cargo side 16b. The passenger side 16a faces the passenger compartment 24 and the cargo side 16b faces the cargo compartment 26 when the panel 16 is in the deployed position. When the panel 16 is in the stowed position, the passenger side 16a faces the bottom of the vehicle interior 22 and the cargo side 16b faces the roof 14, i.e., the headliner.

The panel 16 has a first end 16c and a second end 16d spaced from each other. The panel 16 rotates about the first end 16c. When the panel 16 rotates downwardly from the roof 14, the second end 16d moves away from the roof 14. As shown in the Figures, in the deployed position, the first end 16c is adjacent the vehicle roof 14 and the second end 16d is adjacent the seat 30. Specifically, when the panel 16 is in the deployed position, the second end 16d is adjacent the rear 36b of the seatback 36 and the top 36c of the seatback 36.

The panel 16 extends cross-vehicle. Specifically, the panel 16 extends cross-vehicle from one side of the vehicle 12 to the other side of the vehicle 12. As an example, as shown in the Figures, the vehicle 12 may include a first rear seat 30 and a second rear seat 30, the panel 16 extends from the first rear seat 30 to the second rear seat 30. As described above, the seat 30 has an inboard side 30b and an outboard side 30a. The panel 16 extends from the outboard side 30a of the first rear seat 30 to the outboard side 30a of the second rear seat 30.

The panel 16 may include at least one opening 16e extending through the panel 16. As shown in the Figures, the panel 16 has a plurality of openings 16e. The opening 16e extends through the panel 16 from the vehicle-passenger compartment 24 to the vehicle-cargo compartment 26. Specifically, the opening 16e extends through the panel 16 from passenger side 16a to the cargo side 16b. In the deployed position, the opening 16e provides an unobstructed view of the cargo compartment 26 and a view of the road behind the vehicle 12 from the vehicle-passenger compartment 24, depending on the size of the objects in the cargo compartment 26.

The panel 16 may have a first portion and a second portion (not shown). In examples with the first portion and the second portion, the first portion and the second portion are hingedly connected. The first portion and the second portion may each have a first end and a second end. In the deployed position, the first end of the first portion is adjacent the vehicle roof 14 and the second end of the first portion is hingedly connected to the first end of the second portion. In the deployed position, the second end of the second portion is nearest the floor 32 of the cargo compartment 26. In other words, the first portion is above the second portion in the deployed position. In examples with the third row seat 30, where the stowed position of the seat 30 is folded, the second end of the second portion may be nearest the seatback 36 of the stowed seat 30. The first portion and the second portion are each elongated cross-vehicle, i.e., the longest dimension of the first portion and the second portion may be along the cross-vehicle axis. In examples with the first portion and the second portion, in the stowed position the passenger side 16a of the first portion and the second portion face each other.

The panel 16 may be of any suitable material, e.g., plastic such as carbon fiber reinforced plastic (CFRP), glass fiber reinforced semi-finished thermoplastic composite (organosheet), etc.; metal such as steel aluminum, etc.; or any other suitable material.

The panel 16 is connected to the vehicle roof 14. Specifically, the panel 16 is rotatably connected to the vehicle roof 14. The panel 16 is rotatable between a stowed position and a deployed position. The panel 16 is rotatable away from the vehicle roof 14 from the stowed position to the deployed position. As shown in the Figures, the panel 16 rotates about the first end 16c. When the panel 16 rotates from the stowed position to the deployed position, the second end 16d of the panel 16 moves downwardly away from the vehicle roof 14. In other words, because the panel 16 rotates about the first end 16c, the position of the first end 16c is static relative to the vehicle roof 14 while the second end 16d moves downwardly in an arc relative to the vehicle roof 14.

The panel 16 may be directly connected to the vehicle roof 14. The panel 16 may be directly connected to the vehicle roof 14 with, e.g., fasteners. As an example, the panel 16 and the vehicle roof 14 may each have mounting holes (not shown) and the fasteners are disposed in the mounting holes of the panel 16 and the vehicle roof 14, thereby affixing the panel 16 to the vehicle roof 14. As another example, the panel 16 may be indirectly connected to the vehicle roof 14. In such an example, a support component (not shown) may be disposed between the panel 16 and the vehicle roof 14. In other words, the panel 16 is directly connected to the support component, and the support component is directly connected to the vehicle roof 14.

The panel 16 may be directly supported on the vehicle roof 14. In examples where the panel 16 is directly supported on the vehicle roof 14, the vehicle roof 14 supports the weight of the panel 16. Specifically, when the panel 16 is directly supported by the vehicle roof 14, the vehicle roof 14 supports the entire weight of the panel 16. The panel 16 may be indirectly connected to the vehicle roof 14 and directly supported by the vehicle roof 14. In examples with the support component, as described above, the panel 16 may be indirectly connected to the vehicle roof 14 and the vehicle roof 14 supports the entire weight of the panel 16 and the support component.

The panel 16 may be indirectly supported on the vehicle roof 14. In examples where the panel 16 is indirectly supported on the vehicle roof 14, the vehicle roof 14 may support some or none of the weight of the panel 16. In other words, a secondary vehicle component supports some or all of the weight of the panel 16 and the secondary vehicle component is connected to the roof 14. As one example, the panel 16 may be connected to the pillars. In this example, the vehicle roof 14 is connected to the pillars, and the vehicle roof 14 does not support the weight of the panel 16. As another example where the vehicle 12 includes the support component, the support component may be connected to the vehicle roof 14 and the pillar, e.g., an L-bracket. In this example, the vehicle roof 14 supports some of the weight of the panel 16 and the pillar supports some of the weight of the panel 16. In other words, the panel 16 is indirectly supported by the vehicle roof 14. As yet another example, the panel 16 may be directly connected to the vehicle roof 14 and indirectly supported by the vehicle roof 14. In such an example, the panel 16 may be connected to, for example, the vehicle roof 14 and the pillars. The pillars support some or all of the weight of the panel 16, and the panel 16 is directly connected to the vehicle roof 14 as described above, i.e., with mounting holes and fasteners.

The panel 16 may be adjacent the first rear seat 30 and the second rear seat 30 in the deployed position. The panel 16 may be adjacent the seatback 36 of the first rear seat 30 and the second rear seat 30 in the deployed position. As an example, shown in the Figures, the panel 16 abuts the seatback 36 of the first rear seat 30 and the second rear seat 30 in the deployed position. The second end 16d of the panel 16 abuts the seatback 36 of the first rear seat 30 and the second rear seat 30 in the deployed position.

The panel 16 may be generally parallel to the roof 14 in the stowed position. As shown in the Figures, in the stowed position, the second end 16d of the panel 16 is adjacent the headliner in the stowed position. As described above, the headliner may define a cavity to house the panel 16 in the stowed position. The cavity may be generally parallel to the roof 14 and the panel 16 is generally parallel with the cavity.

The panel 16 may include the mating locking component 46 for the locking device 44 described above. The mating locking component 46 engages with the locking device 44 to lock the panel 16 in the deployed position. The mating locking component 46 is supported on the passenger side 16a of the panel 16 adjacent the second end 16d. In examples where the panel 16 includes the first portion and the second portion, the mating locking component 46 is adjacent the second end of the second portion. The mating locking component 46 may be of any suitable size and shape.

The panel assembly 48 includes an airbag assembly 54 supported on the panel 16. The airbag assembly 54 includes at least one airbag 18 inflatable to an inflated position, an inflator 50, and may include a housing 56. The airbag 18, the inflator 50, and the housing 56 may be supported on the panel 16.

As discussed above, the airbag 18 is supported on the panel 16. As shown in the Figures, the airbag 18 is directly supported on the panel 16, i.e., the weight of the airbag 18 is entirely supported on the panel 16. When the panel 16 is in the stowed position the airbag 18 is in the uninflated position. When the panel 16 is in the deployed position, the airbag 18 is in the uninflated position during normal operation of the vehicle 12. As shown in the Figures, the airbag 18 is spaced from the vehicle roof 14 when the panel 16 is in the deployed position. In the event of an impact to the vehicle 12, and when the panel 16 is in the deployed position, the airbag 18 may be inflated. In other words, the airbag 18 is inflatable in the vehicle-forward direction from the uninflated position to the inflated position when the panel 16 is in the deployed position. The airbag 18 is elongated cross-vehicle when the panel 16 is in the deployed position. Specifically, the airbag 18 extends from the one side of the vehicle 12 to the other side of the vehicle 12.

The airbag 18 is inflatable above the seatback 36 when the panel 16 is in the deployed position. In the example where the vehicle 12 includes the first seat 30 and the second seat 30, the airbag 18 is inflatable to the inflated position above the seatbacks 36 of the first seat 30 and the second seat 30. Specifically, the airbag 18 extends vehicle-forward above the top 36c of the seatback 36 in the inflated position. The airbag 18 may extend vehicle-forward beyond the front 36a of the seatback 36 in the inflated position. In examples where the seat 30 includes the head restraint 42, the airbag 18 is inflatable around the head restraint 42. Specifically, the airbag 18 may inflate vehicle-forward on an inboard and an outboard side of the head restraint 42. In such an example, the airbag 18 is continuous from the inboard side of the head restraint 42 to the outboard side of the head restraint 42. The airbag 18 may extend vehicle-forward beyond the head restraint 42. In the event of a vehicle impact, the airbag 18 may inflate to the inflated position to control kinematics of occupants 28 seated in the seats 30 of the vehicle 12.

The airbag assembly 54 may include any suitable number of airbags 18 supported by the panel 16 and extending vehicle-forward from the panel 16 in the inflated position. The airbag assembly 54 may include a number of airbags 18 that is equal to the number of seats 30.

As set forth above, the airbag 18 is inflatable around the head restraint 42. In other words, the airbag 18 deploys in the direction of the occupant seating area 40. In the inflated position, the airbag 18 may partially surround a portion of the occupant seating area 40.

The airbag 18 may be a single continuous unit, e.g., a single piece of fabric. Alternatively, the airbag 18 may include a plurality of segments, i.e., two or more. The segments may be attached to each other in any suitable fashion, e.g., a plurality of segments attached by stitching, ultrasonic welding, etc. The segment(s) may define an inflation chamber. During inflation, the inflation chamber may be inflated from the uninflated position to the inflated position. For example, the segments may be in fluid communication with the inflator 50. In this situation, the segments may be pushed vehicle-forward away from the panel 16 by gas flow in the inflation chamber during inflation of the airbag 18. The airbag 18, i.e., the segment(s) and the inflation chamber, may be of any suitable size and shape.

The airbag 18 may include a plurality of internal tethers (not shown) disposed in the inflation chamber. The internal tethers may extend across the inflation chamber, e.g., from the housing 56 to the segment(s). The internal tethers may be fixed, e.g., via stitching, ultrasonic welding, etc., to the housing 56 and the panel 16 in the inflation chamber. The airbag 18 may include any suitable number of internal tethers. The internal tethers may be of any suitable material. For example, the internal tethers may be a same material as the airbag 18. As another example, the internal tethers may be a different material than the airbag 18. The internal tethers may be positioned to control the shape of the airbag 18.

The panel 16 is rigid relative to the airbag assembly 54. Specifically, the panel 16 is rigid relative to the airbag 18. The panel 16 may be of any suitable material that is rigid relative to the airbag 18, e.g., metal, plastic, etc. The rigidity of the panel 16 relative to the airbag 18 allows the panel 16 to act as a reaction surface for the airbag 18 in the inflated position. The rigidity of the panel 16 also allows the panel 16 to act as a reaction surface for objects from the cargo compartment 26 that are urged vehicle-forward in the event of a sudden stop or impact.

The airbag 18 may be fabric, e.g., a woven polymer. For example, the fabric may be woven nylon yarn, e.g., nylon 66. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 1:
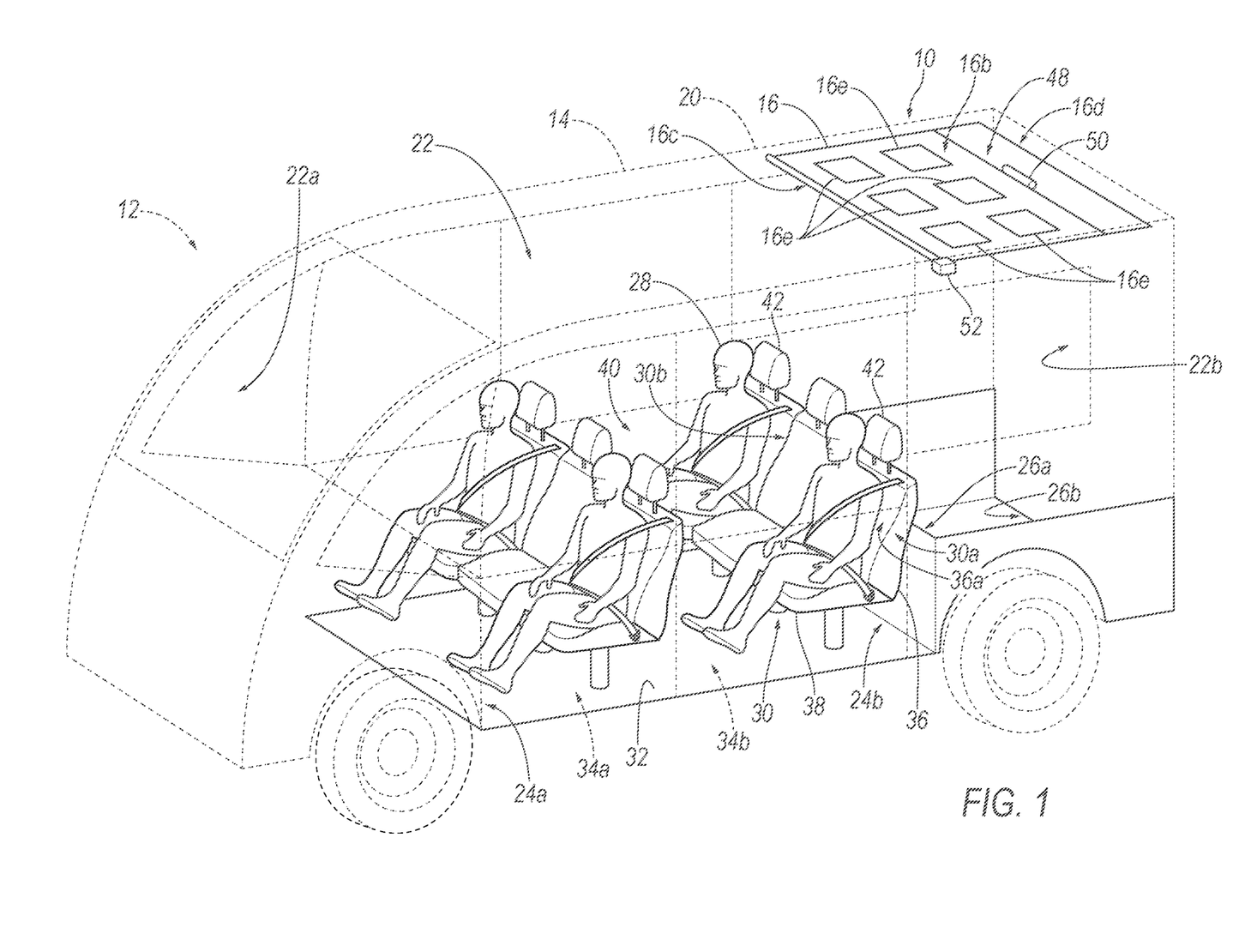
FIG. 1 is a perspective view of a vehicle having a passenger compartment and a cargo compartment with an assembly including a panel in the stowed position.
Figure 2A:
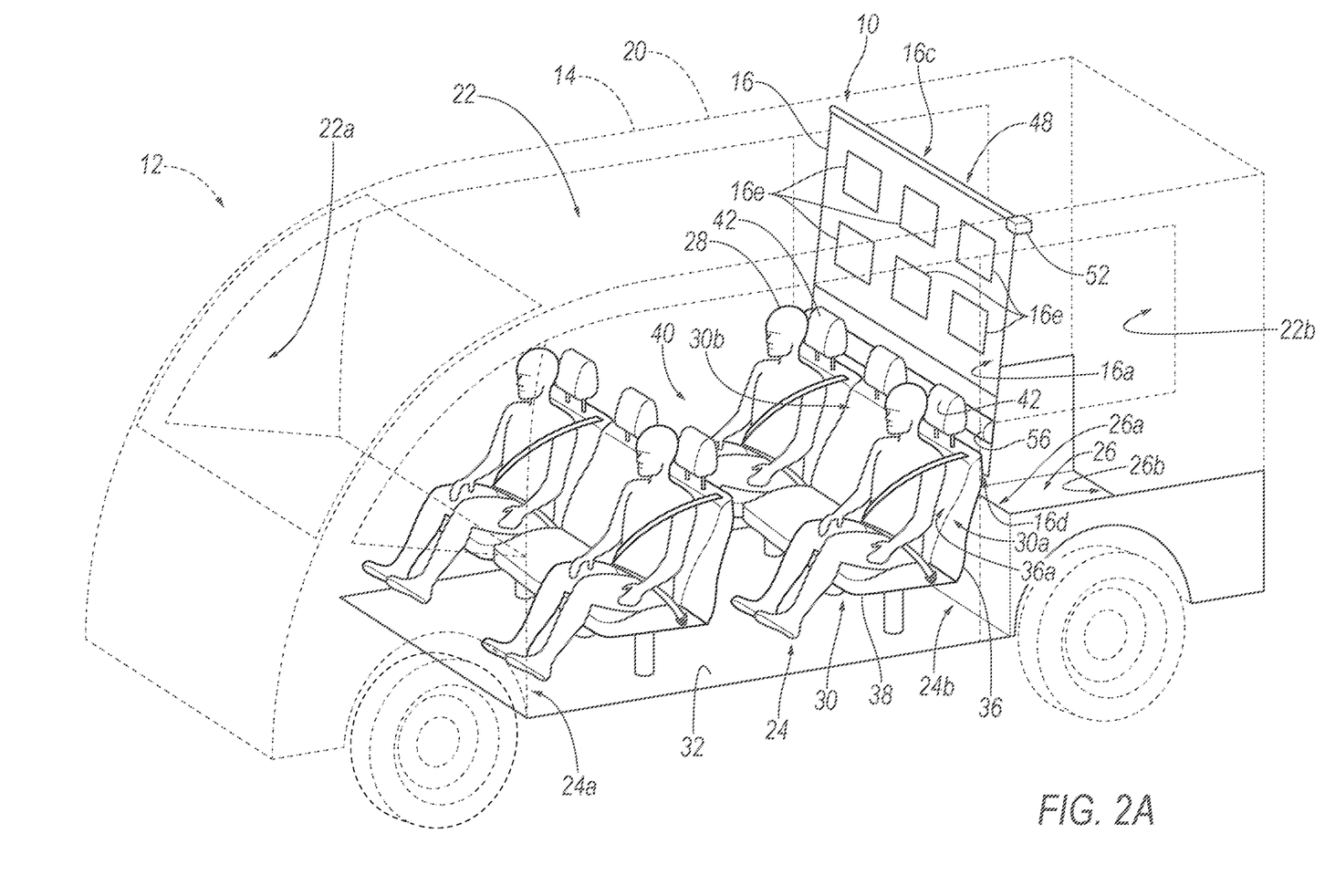
FIG. 2A is a perspective view of the vehicle with the assembly including the panel and an airbag, the panel being in the deployed position and the airbag being in the uninflated position.
Figure 2B:
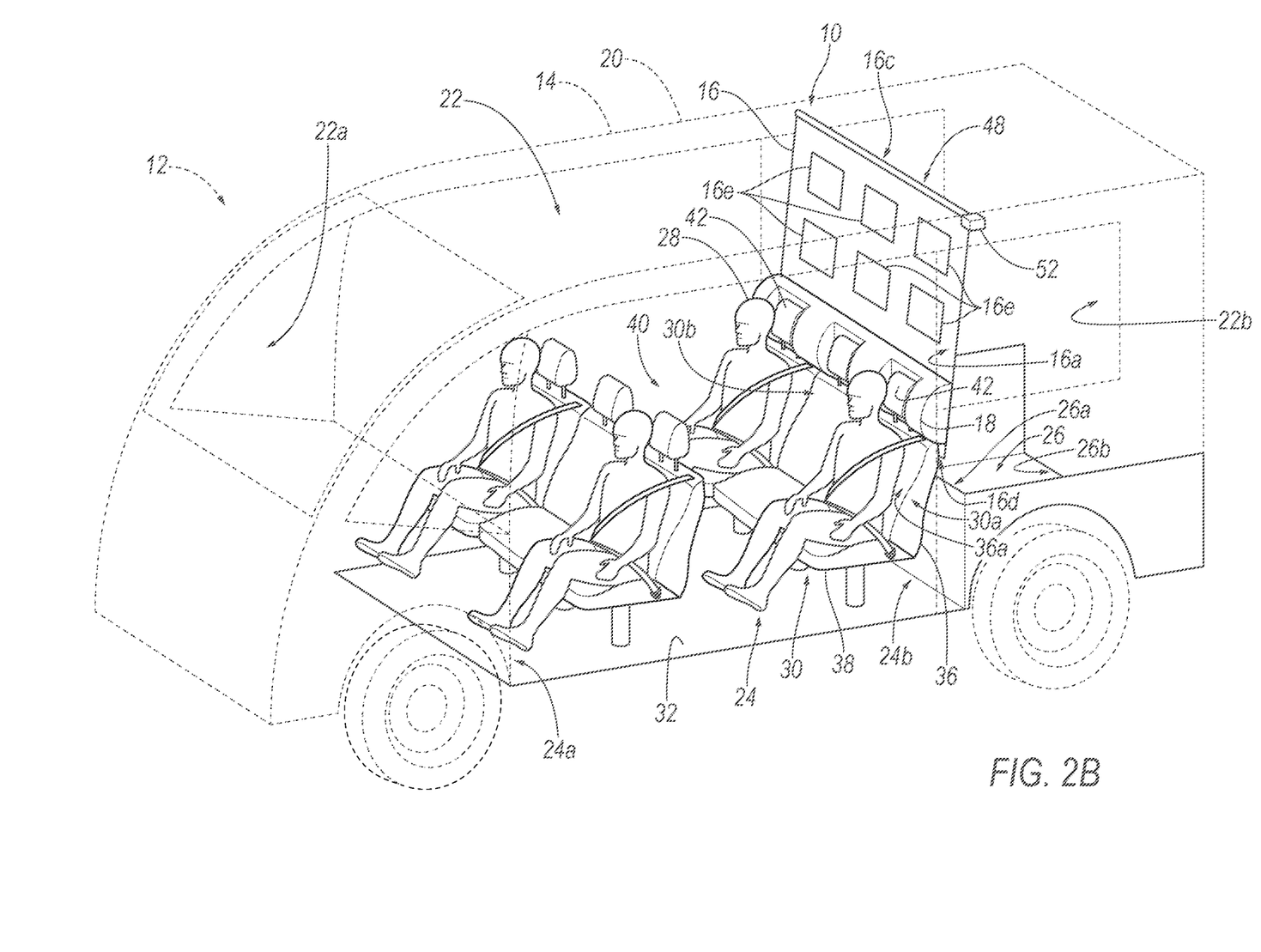
FIG. 2B is a perspective view of the vehicle with the assembly including the panel in the deployed position and the airbag in the inflated position.
Figure 3:
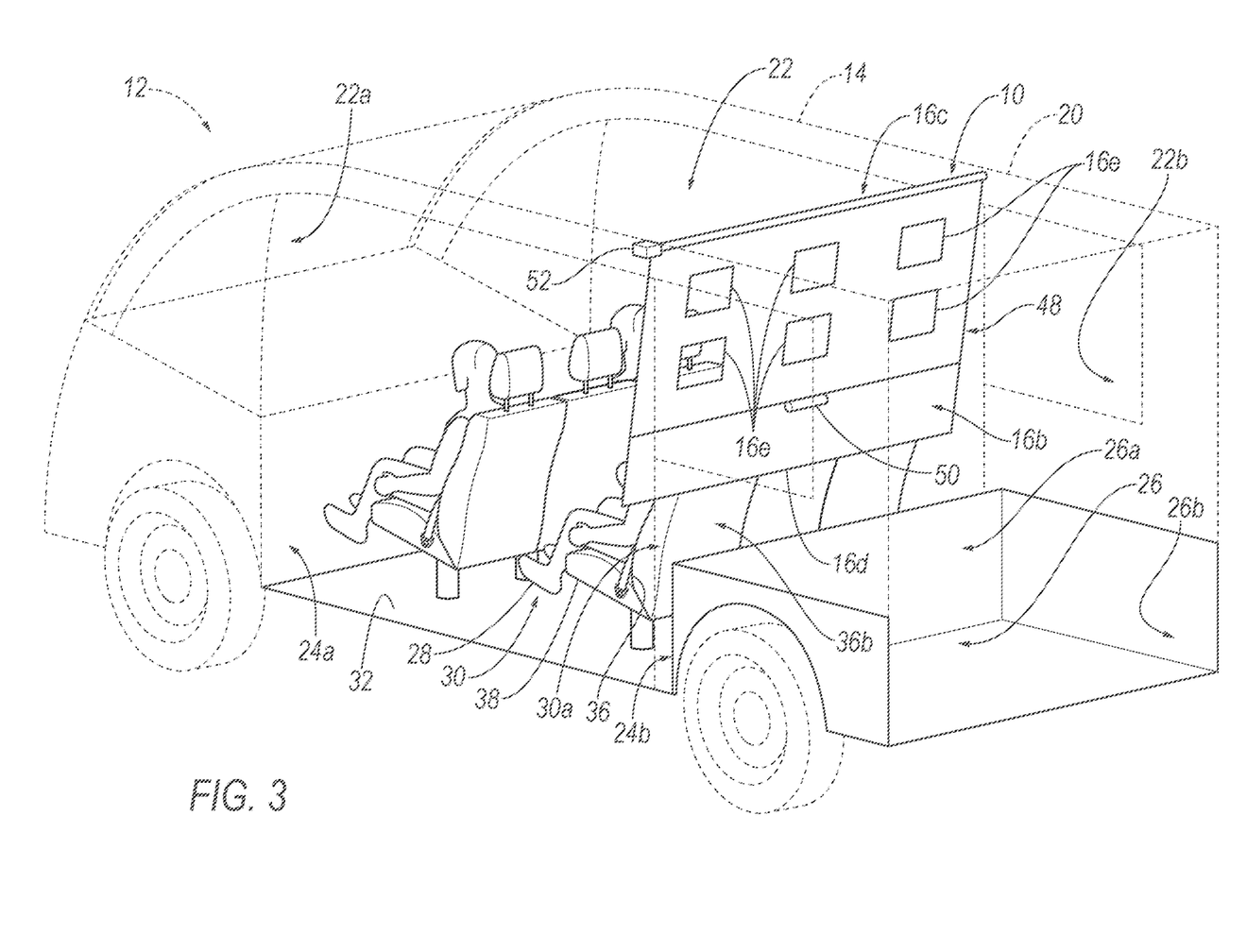
FIG. 3 is a rear view of the vehicle with the assembly including the panel in the deployed position.
Figure 4:
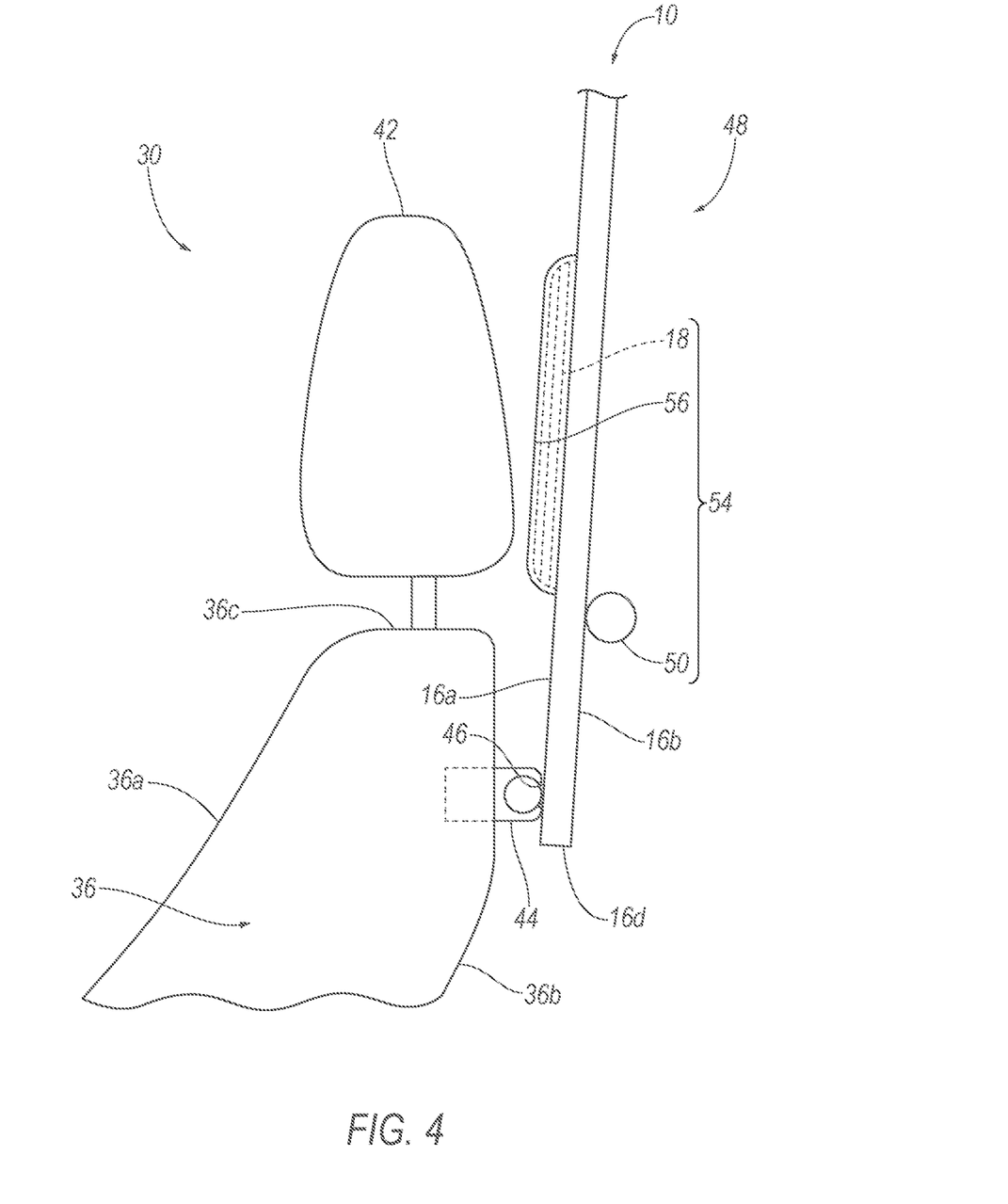
FIG. 4 is a side view of a seatback and the panel in the deployed position and the airbag in the uninflated position.

As shown in FIG. 1, the inflator 50 is supported on the panel 16. The inflator 50 is in fluid communication with the airbag 18. The inflator 50 expands the airbag 18 with inflation medium, such as a gas, to move the airbag 18 from an uninflated position to an inflated position. The inflator 50 may be, for example, a pyrotechnic inflator that ignites a chemical reaction to generate the inflation medium, a stored gas inflator that releases (e.g., by a pyrotechnic valve) stored gas as the inflation medium, or a hybrid. The airbag assembly 54 may include any suitable number of inflators 50. In the example shown in FIG. 1, the airbag assembly 54 includes one inflator 50 to inflate the airbag 18 to the inflated position. In other examples, the size and quantity of the inflator(s) 50 may be adjusted to inflate the airbag 18 to the inflated position.

With reference to the Figures, the vehicle 12 may include a motor 52. The motor 52 is between the vehicle roof 14 and the panel 16. As an example, shown in the Figures, the motor 52 may be supported on the roof 14. Specifically, the motor 52 may be directly supported on the roof 14. As described above, because the motor 52 is directly supported on the roof 14, the roof 14 supports the entire weight of the motor 52. As another example, the motor 52 may be supported by any suitable vehicle component, e.g., a pillar, etc.

In examples with the motor 52, the panel 16 is moveable by the motor 52 between the stowed position and the deployed position. The motor 52 is actuatable to rotate the panel 16 relative to the vehicle roof 14 between the stowed position and the deployed position. In examples without the motor 52, the panel 16 may be moved between the stowed position and the deployed position by the occupant 28. The panel 16 has a deployment path, i.e., the space occupied by the panel 16 when the panel 16 is rotated between the stowed position and the deployed position.

The motor 52 may be coupled to the first end 16c of the panel 16. The vehicle 12 may include any suitable number of motors 52 to move the panel 16 between the stowed position and the deployed position. For example, the vehicle 12 may include a motor 52 supported by the roof 14 on the first side of the panel 16 and a second motor 52 supported by the roof 14 on the second side of the panel 16. The motor 52 may be of any suitable type, e.g., a brushless motor, a servo motor, a stepper motor, etc.

The motor 52 may include a pressure sensor 68. The pressure sensor 68 may detect resistance to movement of the panel 16. In response to the resistance, the motor 52 stops the movement of the panel 16. In other words, the rotation of the panel 16 by the motor 52 is stopped in response to an obstacle detected by the pressure sensor 68. As one example, the motor 52 may stop in response to the panel 16 contacting a box and the box resists the movement of the panel 16. In this example, the box may be in the cargo compartment 26 and in the deployment path of the panel 16. When the panel 16 contacts the box, the box provides resistance to the panel 16's downward movement and the motor 52 stops. As another example, the motor 52 may stop in response to the panel 16 contacting an occupant 28 and the occupant 28 resists the movement of the panel 16. As described further below, the motor 52 may be controlled by a controller 58. The controller 58 may stop operation of the motor 52 in response to detecting an object in the path of the panel 16, e.g., detection by the pressure sensor 68.

Figure 5:
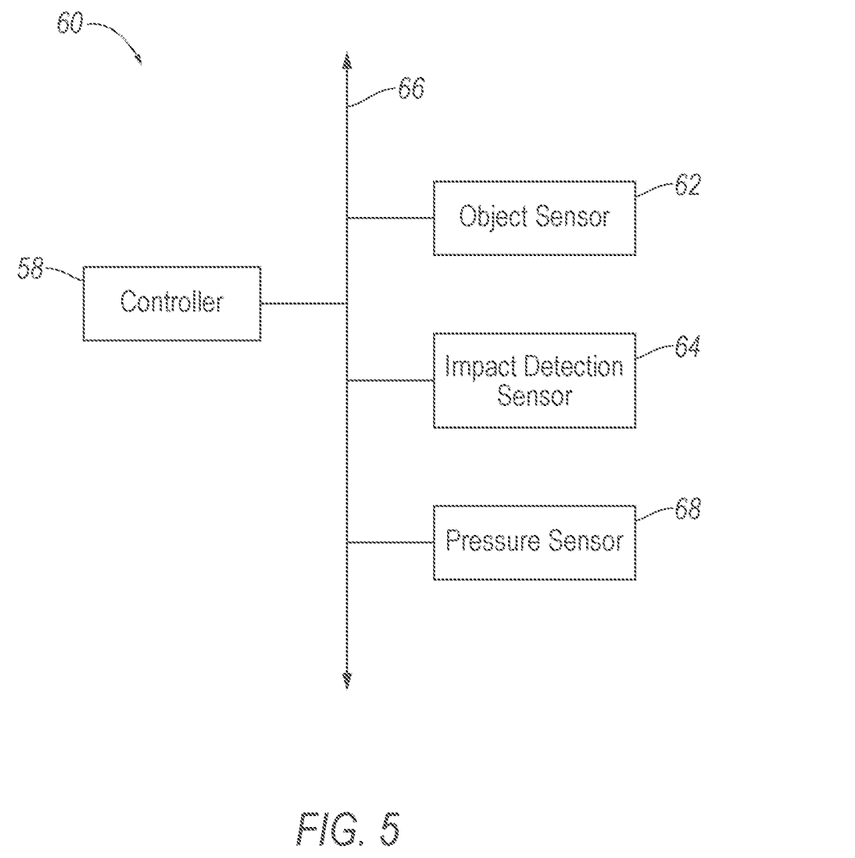
FIG. 5 is a block diagram of a vehicle communications network.

With reference to FIG. 5, the vehicle 12 includes a control system 60. The control system 60 may include a controller 58, an object sensor 62, an impact detection sensor 64, the motor 52, and the inflator 50 in communication through a communications network 66.

The control system 60 includes the object sensor 62 for the panel 16. The object sensor 62 is configured to detect an object in the cargo compartment 26. Specifically, the object sensor 62 is configured to detect an object in the deployment path of the panel 16. The object sensor 62 may be visible-light or infrared cameras directed at the cargo compartment 26, pressure sensors under the floor 32 of the cargo compartment 26, contact sensors, or other suitable sensors. The object sensor 62 is in communication with the controller 58 via the communications network 66.

The impact detection sensor 64 may be in communication with the controller 58. The impact detection sensor 64 is programmed to detect an impact to the vehicle 12. The impact detection sensor 64 may be of any suitable type, for example, post-contact sensors such as accelerometers, pressure sensors, and contact switches; and pre-impact detection sensors 64 such as radar, lidar, and vision-sensing systems. The vision systems may include one or more cameras, CCD image sensors, CMOS image sensors, etc. The impact detection sensor 64 may be located at numerous points in or on the vehicle 12.

The controller 58 may be a microprocessor-based computing device implemented via circuits, chips, or other electronic components. The controller 58 may include a processor, memory, etc. The memory of the controller 58 may store instructions executable by the processor and the processor may read the instructions from the memory and execute the instructions. Specifically, the memory stores instructions executable by the processor, i.e., the controller 58 is programmed, to perform the [process/method] described below. The controller 58 may be, for example, a restraints control module. Use of "in response to," "based on," and "upon determining" with reference to the controller 58 and the [process/method] indicates a causal relationship, not merely a temporal relationship.

The control system 60 may transmit signals through the communications network 66 such as a controller area network (CAN) bus, Ethernet, Local Interconnect Network (LIN), and/or by any other wired or wireless communications network 66.

The controller 58 is programmed to rotate the panel 16 between the stowed position and the deployed position based on, for example, vehicle initialization, a user selection, or detecting that an object has been placed in the cargo compartment 26.

Vehicle initialization may include, for example, engine ignition (e.g., when the vehicle 12 has an internal combustion engine), start of a vehicle electrical system, user interaction with the vehicle 12, etc. As one example, the occupant of the vehicle 12 may start the engine. In response to the starting of the engine, the controller 58 instructs the motor 52 to rotate the panel 16 from the stowed position to the deployed position. Similarly, in response to shutting off the engine, the controller 58 instructs the motor 52 to rotate the panel 16 from the deployed position to the stowed position. As another example, the occupant of the vehicle 12 may start the electrical system. In response to the starting of the electrical system, the controller 58 instructs the motor 52 to rotate the panel 16 from the stowed position to the deployed position. Similarly, in response to shutting off the electrical system, the controller 58 instructs the motor 52 to rotate the panel 16 from the deployed position to the stowed position. As yet another example, the occupant of the vehicle 12 may interact with the vehicle 12, e.g., pushing a button, and in response to the user interaction the controller 58 may instruct the motor 52 to move the panel 16 from the deployed position to the stowed position. Similarly, in response to the user interaction, the controller 58 may instruct the motor 52 to move the panel 16 from the stowed position to the deployed position.

The object sensor 62 may detect that an object has been placed in the cargo compartment 26 by, e.g., the occupant 28 of the vehicle 12. In response to the object sensor 62 detecting the object in the cargo compartment 26, the controller 58 may instruct the motor 52 to rotate the panel 16 from the stowed position to the deployed position. Similarly, in response to the object sensor 62 detecting the object has been removed from the cargo compartment 26, the controller 58 may instruct the motor 52 to rotate the panel 16 from the deployed position to the stowed position. In other words, the panel 16 may be in the deployed position only when an object is detected in the cargo compartment 26.

The controller 58 is programmed to stop rotation of the panel 16 between the stowed position and the deployed position in response to an object in the deployment path of the panel 16 detected by the object sensor 62. As an example, the panel 16 may be in the stowed position, and the occupant may place an object in the cargo compartment 26 that extends vertically from the floor 32 of the cargo compartment 26 to above the top 36c of the seatback 36. In other words, the object is in the deployment path of the panel 16. In such an example, the controller 58 may instruct the motor 52 to rotate the panel 16 from the stowed position to the deployed position, as described above. As the panel 16 is rotated, the object sensor 62 may detect the object in the deployment path of the panel 16. In response to the detected object in the deployment path of the panel 16, the controller 58 instructs the motor 52 to stop rotation of the panel 16. The controller 58 may instruct the motor 52 to start rotation of the panel 16 when, for example, the object is removed from the deployment path of the panel 16, i.e., the object sensor 62 no longer detects an object in the deployment path of the panel 16.

The controller 58 may be programmed to identify an impact to the vehicle 12. For example, the controller 58 may determine that a vehicle impact has occurred based on information received from the impact sensor via the communications network 66. In response to the identification of a vehicle impact, the controller 58 is programmed to inflate the airbag 18. The controller 58 may be programmed to initiate inflation of the airbag 18 by instructing the inflator 50 to release the inflation medium in response to a detected vehicle impact.

Computing devices, such as the controller 58, generally include computer executable instructions, where the instructions may be executable by one or more computing devices such as those listed above. Computer-executable instructions may be compiled or interpreted from computer programs created using a variety of programming languages and/or technologies, including, without limitation, either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the panel 16 is in the deployed position and the airbag 18 is in the uninflated position, under normal operating conditions of the vehicle 12. As an example, upon vehicle initialization, the controller 58 may perform process 600 shown in FIG. 6.

Figure 6:
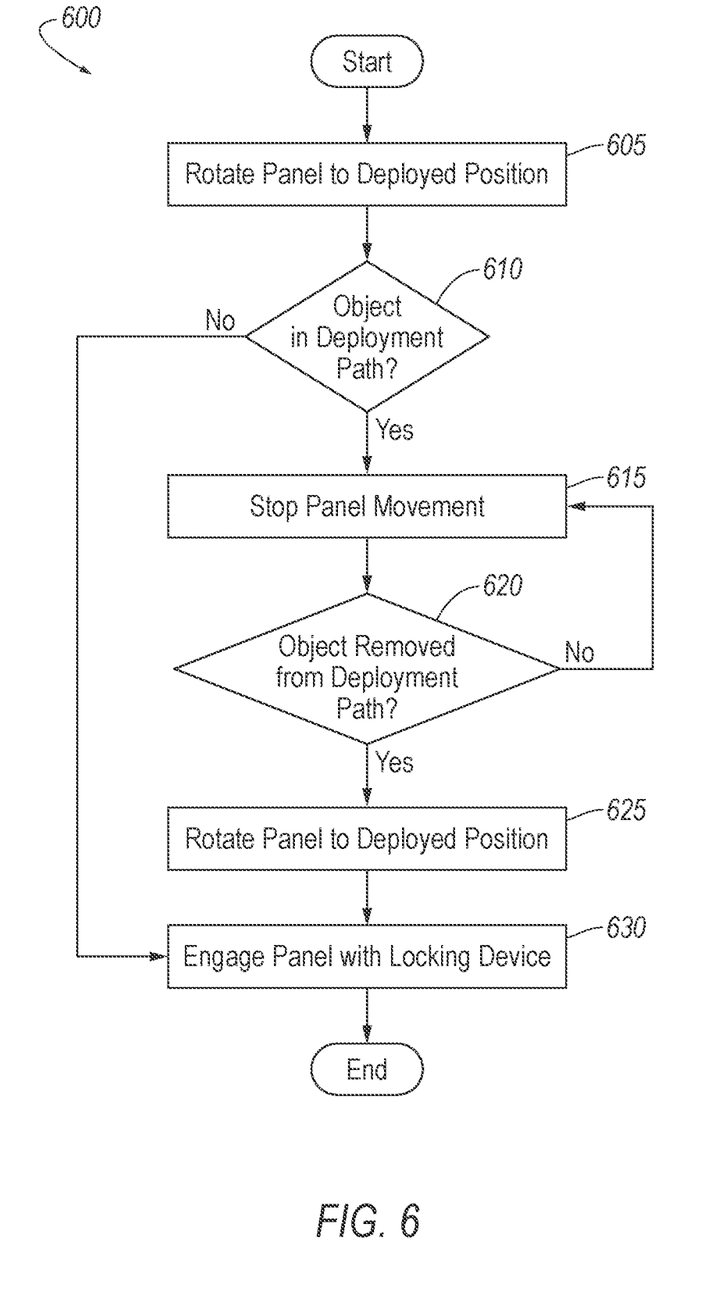
FIG. 6 is a flow diagram of a process.

With reference to block 605, in response to vehicle initialization, the controller 58 instructs the motor 52 to move the panel 16 to the deployed position. The process moves to block 610.

With reference to block 610, the object sensor 62 detects whether an object is in the deployment path of the panel 16. If no object is detected, the process moves to block 630. If an object is detected, the process moves to block 615.

With reference to block 615, the controller 58 instructs the motor 52 to stop movement of the panel 16. The process moves to block 620.

With reference to block 620, the controller 58 waits for the object sensor 62 to detect no object in the deployment path of the panel 16, i.e., removal of the object from the deployment path of the panel 16. When the object is removed, the process moves to block 625. In block 625, the controller 58 instructs the motor 52 to continue movement of the panel 16 to the deployed position. When the panel 16 is in the deployed position, if the controller 58 is in communication with the locking device 44 the process moves to block 630. If the locking device 44 is not in communication with the controller 58, the process ends.

With reference to block 630, the controller 58 instructs the locking device 44 to engage the panel 16. Specifically, the controller 58 instructs the locking device 44 to engage the mating locking component 46.

The disclosure has been described in an illustrative manner, and it is understood that the terminology which has been used is intended to be in the nature of words of description rather than of limitation. Use of "in response to," "based on," and "upon determining" herein indicates a causal relationship, not merely a temporal relationship. The adjectives "first," "second," etc., are used herein merely as identifiers and are not used to identify order or importance. Many modifications and variations of the present disclosure are possible in light of the above teachings, and the disclosure may be practiced otherwise than as specifically described.

The invention claimed is:

1. An assembly comprising:
a vehicle roof;
a panel rotatably connected to the vehicle roof and rotatable away from the vehicle roof from a stowed position to a deployed position;
an airbag supported on the panel, the airbag being inflatable in a vehicle-forward direction from an uninflated position to an inflated position when the panel is in the deployed position; and
a vehicle-passenger compartment and a vehicle-cargo compartment below the vehicle roof, the panel in the deployed position being between the vehicle-passenger compartment and the vehicle-cargo compartment.

2. The assembly of claim 1, further comprising a seat having a seatback, the panel being adjacent the seatback in the deployed position.

3. The assembly of claim 2, wherein the panel abuts the seatback in the deployed position.

4. The assembly of claim 1, wherein the panel is rigid relative to the airbag.

5. The assembly of claim 1, further comprising a seat having a seatback, the airbag being inflatable above the seatback when the panel is in the deployed position.

6. The assembly of claim 5, wherein the seat includes a head restraint, the airbag being inflatable around the head restraint.

7. The assembly of claim 1, further comprising a first seat and a second seat, the panel being adjacent the first seat and the second seat in the deployed position.

8. The assembly of claim 1, further comprising a first seat and a second seat each having a seatback, the airbag being inflatable to an inflated position above the seatbacks of the first seat and the second seat.

9. The assembly of claim 1, further comprising a motor between the vehicle roof and the panel, the motor being actuatable to rotate the panel relative to the vehicle roof between the stowed position and the deployed position.

10. The assembly of claim 9, wherein the motor includes a pressure sensor, the rotation of the panel being stopped in response to an obstacle detected by the pressure sensor.

11. The assembly of claim 1, further comprising a seat having a seatback, a locking device supported on the seatback, the panel being engaged with the locking device in the deployed position.

12. The assembly of claim 1, wherein the airbag is elongated cross-vehicle when the panel is in the deployed position.

13. The assembly of claim 1, wherein the airbag is spaced from the vehicle roof when the panel is in the deployed position.

14. The assembly of claim 13, wherein the panel includes at least one opening extending through the panel from the vehicle-passenger compartment to the vehicle-cargo compartment.

15. The assembly of claim 1, further comprising a controller programmed to rotate the panel from the stowed position to the deployed position in response to vehicle initialization.

16. The assembly of claim 15, wherein the controller is programmed to rotate the panel between the deployed position and the stowed position in response to a user selection.

17. The assembly of claim 15, wherein the controller is programmed to stop rotation of the panel in response to a detected object.

\* \* \* \* \*